(12) United States Patent
Nishijima

(10) Patent No.: US 12,059,058 B2
(45) Date of Patent: Aug. 13, 2024

(54) CYCLING SHOE ASSEMBLY, CYCLING SHOE AND CLEAT FOR CYCLING SHOE

(71) Applicant: Shimano Inc., Osaka (JP)

(72) Inventor: Shota Nishijima, Osaka (JP)

(73) Assignee: Shimano Inc., Osaka (JP)

(*) Notice: Subject to any disclaimer, the term of this patent is extended or adjusted under 35 U.S.C. 154(b) by 268 days.

(21) Appl. No.: 17/502,752

(22) Filed: Oct. 15, 2021

(65) Prior Publication Data
US 2023/0120200 A1   Apr. 20, 2023

(51) Int. Cl.
    *A43C 15/16*    (2006.01)
    *A43B 5/14*     (2006.01)
    *B62M 3/08*     (2006.01)

(52) U.S. Cl.
    CPC .............. *A43C 15/161* (2013.01); *A43B 5/14* (2013.01); *B62M 3/08* (2013.01); *B62M 3/083* (2013.01); *B62M 3/086* (2013.01)

(58) Field of Classification Search
    CPC ..................................................... A43B 5/14
    See application file for complete search history.

(56) References Cited

U.S. PATENT DOCUMENTS

| | | | | |
|---|---|---|---|---|
| 5,269,081 A | * | 12/1993 | Gray | A61B 5/6807 600/592 |
| 10,342,285 B2 | | 7/2019 | Aoki et al. | |
| 2015/0025816 A1 | * | 1/2015 | Ross | A43B 17/00 702/44 |
| 2015/0253210 A1 | * | 9/2015 | Ashby | A43B 5/14 702/41 |
| 2022/0411014 A1 | * | 12/2022 | Meadows | A43B 3/38 |

FOREIGN PATENT DOCUMENTS

TW         I556755 B    * 11/2016
WO    WO-2014144544 A1  *  9/2014  ............. A41D 13/01

OTHER PUBLICATIONS

USPTO Machine Translation (retrieved from FIT database) of the Description of TW I556755 B, Guo, Nov. 11, 2016. (Year: 2023).*

* cited by examiner

*Primary Examiner* — Daniel D Yabut
(74) *Attorney, Agent, or Firm* — Global IP Counselors, LLP (57) ABSTRACT

A cycling shoe assembly is basically provided with a cleat and a shoe. The cycling shoe is configured to be coupled to the cleat. In one configuration, the cycling shoe has a first connector that is configured to be electrically connected to a pedal in a coupled state where the cleat is coupled with the pedal. In another configuration, the cleat has a second connector that is configured to be electrically connected to a pedal in a coupled state where the cleat is coupled with the pedal.

19 Claims, 10 Drawing Sheets

CYCLING SHOE ASSEMBLY, CYCLING SHOE AND CLEAT FOR CYCLING SHOE

BACKGROUND

Technical Field

This disclosure generally relates to a cycling shoe assembly, a cycling shoe and a cleat for a cycling shoe.

Background Information

Various types of cycling shoes are available to suit a rider's riding style (e.g., road riding or off-road riding. Many bicycles use step-in or clipless pedals, which are used with cycling shoes having a cleat attached to the bottom of the sole. The step-in or clipless pedal engages the cleat to releasably secured to the pedal to the sole of the cycling shoe. In particular, with this type of bicycle pedal, the rider steps onto the pedal, and a clamping mechanism automatically grips the cleat to secure the pedal to the cleat. When releasing the cycling shoe from the pedal, the rider will typically turn the cycling shoe about an axis perpendicular to the tread of the pedal. As a result of the pivoting action, the clamping mechanism releases the cleat from the sole. Typically, the position of the cleat on the sole can be adjusted by loosening two or more bolts that fasten the cleat to the sole. For example, a cycling shoe that has a cleat fastened to the sole is disclosed in U.S. Pat. No. 10,342,285, which is assigned to Shimano Inc.

SUMMARY

Generally, the present disclosure is directed to various features of a cycling shoe assembly, a cycling shoe and a cleat that are configured to receive electric power from a remote electric power source.

In view of the state of the known technology and in accordance with a first aspect of the present disclosure, a cycling shoe assembly is provided that basically comprises a cycling shoe and a cleat. The cleat is configured to be coupled to the cycling shoe. The cycling shoe has a first connector that is configured to be electrically connected to a pedal in a coupled state where the cleat is coupled with the pedal.

With the cycling shoe assembly according to the first aspect, the cycling shoe can be electrically connected to a pedal in a coupled state where the cleat is coupled with the pedal for receiving electric power.

In accordance with a second aspect of the present disclosure, a cycling shoe assembly is provided that basically comprises a cycling shoe and a cleat. The cleat is configured to be coupled to the cycling shoe. The cleat has a second connector that is configured to be electrically connected to a pedal in a coupled state where the cleat is coupled with the pedal.

With the cycling shoe assembly according to the second aspect, the cleat can be electrically connected to a pedal in a coupled state where the cleat is coupled with the pedal for receiving electric power.

In accordance with a third aspect of the present disclosure, a cycling shoe assembly is provided that basically comprises a shoe, a cleat, an electric device and a pedal. The cleat is connected to the cycling shoe. At least one of a first connector is provided to the cycling shoe and a second connector is provided to the cleat. The electric device is disposed in one of the cycling shoe and the cleat. The pedal is configured to be coupled to the cleat. The pedal has a third connector that is configured to be electrically connect to the at least one of the first connector and the second connector in a coupled state where the cleat is coupled with the pedal, and supply electric power to the electric device.

With the cycling shoe assembly according to the third aspect, electric power can be supplied from the pedal to at least one electric device provided to at least one of the cycling shoe and the cleat.

In accordance with a fourth aspect of the present disclosure, the cycling shoe assembly according to the third aspect is configured so that the cycling shoe includes the first connector having a first electrical contact, and the third connector includes a third electrical contact configured to be directly in contact with the first electrical contact in the coupled state.

With the cycling shoe assembly according to the fourth aspect, the electrical power can be reliably supplied from the pedal to the cycling shoe using a direct electrical connection.

In accordance with a fifth aspect of the present disclosure, the cycling shoe assembly according to the third aspect or the fourth aspect is configured so that the cleat includes the second connector having a second electrical contact, and the third connector includes a third electrical contact configured to directly contact the second electrical contact in the coupled state.

With the cycling shoe assembly according to the fifth aspect, the electrical power can be reliably supplied from the pedal to the cleat using a direct electrical connection.

In accordance with a sixth aspect of the present disclosure, the cycling shoe assembly according to any one of the third aspect to the fifth aspect is configured so that the cycling shoe includes the first connector having a first electrical contact, and the cleat includes the second connector having a second electrical contact configured to directly contact the second electrical contact.

With the cycling shoe assembly according to the sixth aspect, the electrical power can be reliably supplied from the pedal to the cycling shoe and the cleat using direct electrical connections.

In accordance with a seventh aspect of the present disclosure, the cycling shoe assembly according to any one of the first aspect to the sixth aspect further comprises an electric power source configured to supply the electric power to the electric device via one of the first connector and the second connector.

With the cycling shoe assembly according to the seventh aspect, the electric power can be reliably supplied by the electric power source to the electric device via one of the first connector and the second connector.

In accordance with an eighth aspect of the present disclosure, the cycling shoe assembly according to the seventh aspect is configured so that the electric power source includes at least one of a rechargeable battery and a capacitor.

With the cycling shoe assembly according to the eighth aspect, the electric power source does not need to be replaced when the electric power source becomes discharged.

In accordance with a ninth aspect of the present disclosure, the cycling shoe assembly according to the seventh aspect is configured so that the electric power source includes a wireless device configured to wirelessly supply the electric power.

With the cycling shoe assembly according to the ninth aspect, the electric power can be supplied to the cycling shoe and/or the cleat without establishing a direct electrical connection with the power source of the pedal.

In accordance with a tenth aspect of the present disclosure, the cycling shoe assembly according to the ninth aspect is configured so that the wireless device includes a non-contact charging coil.

With the cycling shoe assembly according to the tenth aspect, the electric power can be reliably supplied using a non-contact charging coil.

In accordance with an eleventh aspect of the present disclosure, the cycling shoe assembly according to any one of the seventh aspect to the tenth aspect is configured so that the electric power source is disposed in the cleat, and the second connector is configured to be supplied the electric power from the electric power source, and to supply the electric power to the electric device in the coupled state.

With the cycling shoe assembly according to the eleventh aspect, the electric power source of the cleat can reliably supply power to the electric device.

In accordance with a twelfth aspect of the present disclosure, the cycling shoe assembly according to any one of the seventh aspect to the tenth aspect is configured so that the electric power source is disposed in the pedal, and the second connector is configured to be supplied the electric power from the electric power source and to supply the electric power to the first connector in the coupled state.

With the cycling shoe assembly according to the twelfth aspect, the electric power source of the pedal can supply power to the cycling shoe via the cleat.

In accordance with a thirteenth aspect of the present disclosure, the cycling shoe assembly according to any one of the first aspect to the sixth aspect further comprises a communicator configured to communicate with at least one bicycle part to receive status data from the at least one bicycle part.

With the cycling shoe assembly according to the thirteenth aspect, the cycling shoe can be adjusted based on the status data from the at least one bicycle part.

In accordance with a fourteenth aspect of the present disclosure, the cycling shoe assembly according to any one of the first aspect to the sixth aspect further comprises a communicator configured to communicate with a rider monitoring device to receive physical data from the rider monitoring device.

With the cycling shoe assembly according to the fourteenth aspect, it the cycling shoe can be adjusted based on the physical data from the rider monitoring device.

In accordance with a fifteenth aspect of the present disclosure, the cycling shoe assembly according to the fourteenth aspect is configured so that the communicator includes a wireless device configured to wirelessly supply the physical data.

With the cycling shoe assembly according to the fifteenth aspect, the cycling shoe can receive physical data without the need of electrical wires.

In accordance with a sixteenth aspect of the present disclosure, a cycling shoe is provided that comprises a sole, an upper, a first connector and an electric power source. The sole is attached to the upper. The electric power source is configured to receive electric power from a pedal and supply the electric power to the first connector in a coupled state where the cycling shoe is coupled with a pedal.

With the cycling shoe according to the sixteenth aspect, the cycling shoe can receive electric power from a pedal.

In accordance with a seventeenth aspect of the present disclosure, the cycling shoe according to the sixteenth aspect is configured so that the electric power source includes a wireless device configured to wirelessly receive the electric power.

With the cycling shoe according to the seventeenth aspect, the electric power can be supplied to the cycling shoe without establishing a direct electrical connection with the power source of the pedal.

In accordance with an eighteenth aspect of the present disclosure, a cleat is provided for a cycling shoe. The cleat comprises a second connector and an electric power source. The electric power source is configured to receive electric power from a pedal and supply the electric power to the second connector in a coupled state where the cleat is coupled with a pedal.

With the cleat according to the eighteenth aspect, the cleat can receive electric power from a pedal.

In accordance with a nineteenth aspect of the present disclosure, the cleat according to the eighteenth aspect is configured so that the electric power source includes a wireless device configured to wirelessly supply the electric power.

With the cleat according to the nineteenth aspect, the electric power can be supplied to the cleat without establishing a direct electrical connection with the power source of the pedal.

Also, other objects, features, aspects and advantages of the disclosed cycling shoe assembly will become apparent to those skilled in the art from the following detailed description, which, taken in conjunction with the annexed drawings, discloses preferred embodiments of the cycling shoe assembly, the cycling shoe and the cleat.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
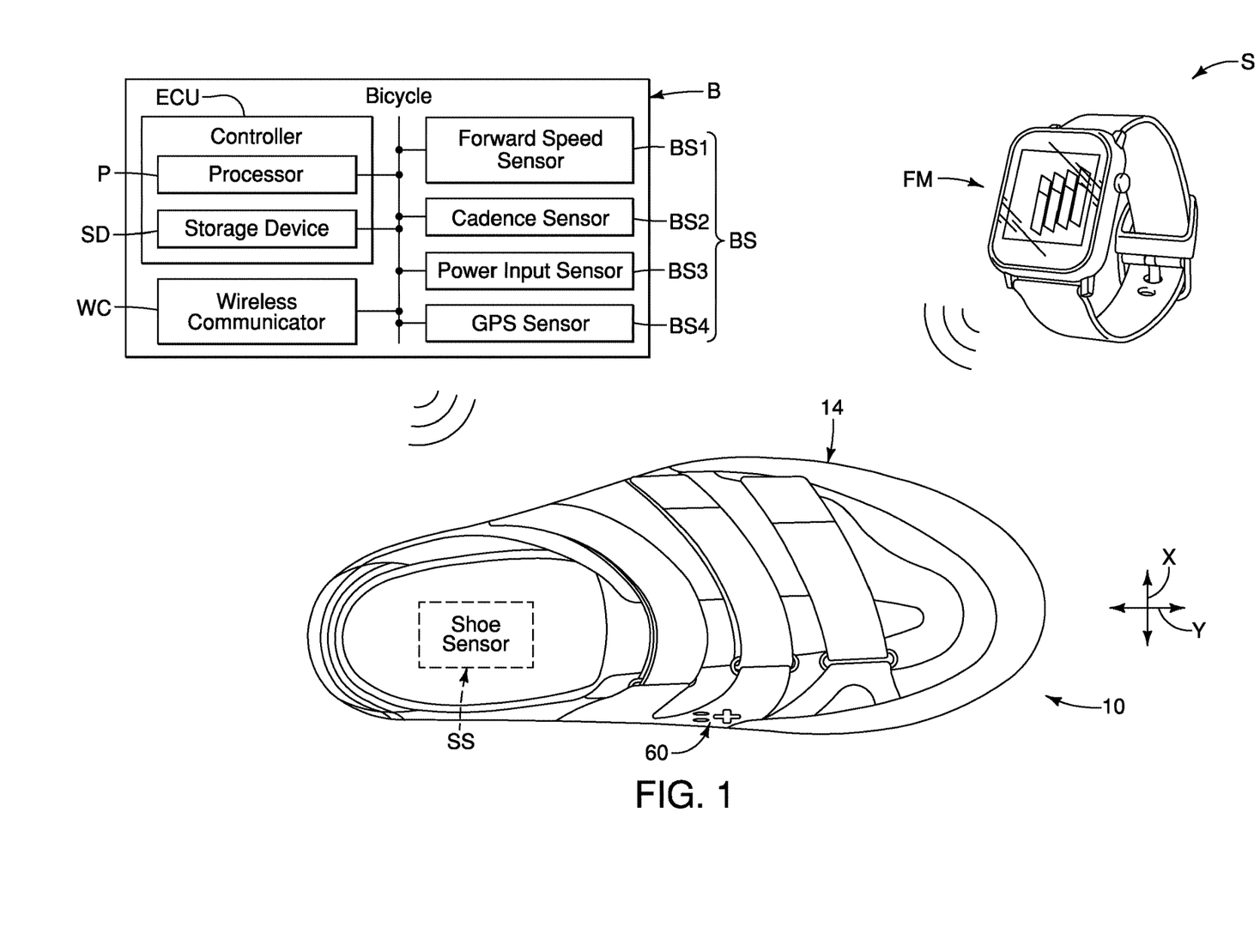
FIG. 1 is an overall diagrammatic view of a cycling shoe system having a cycling shoe assembly that includes a cycling shoe and a cleat accordance with one embodiment.
Figure 2:
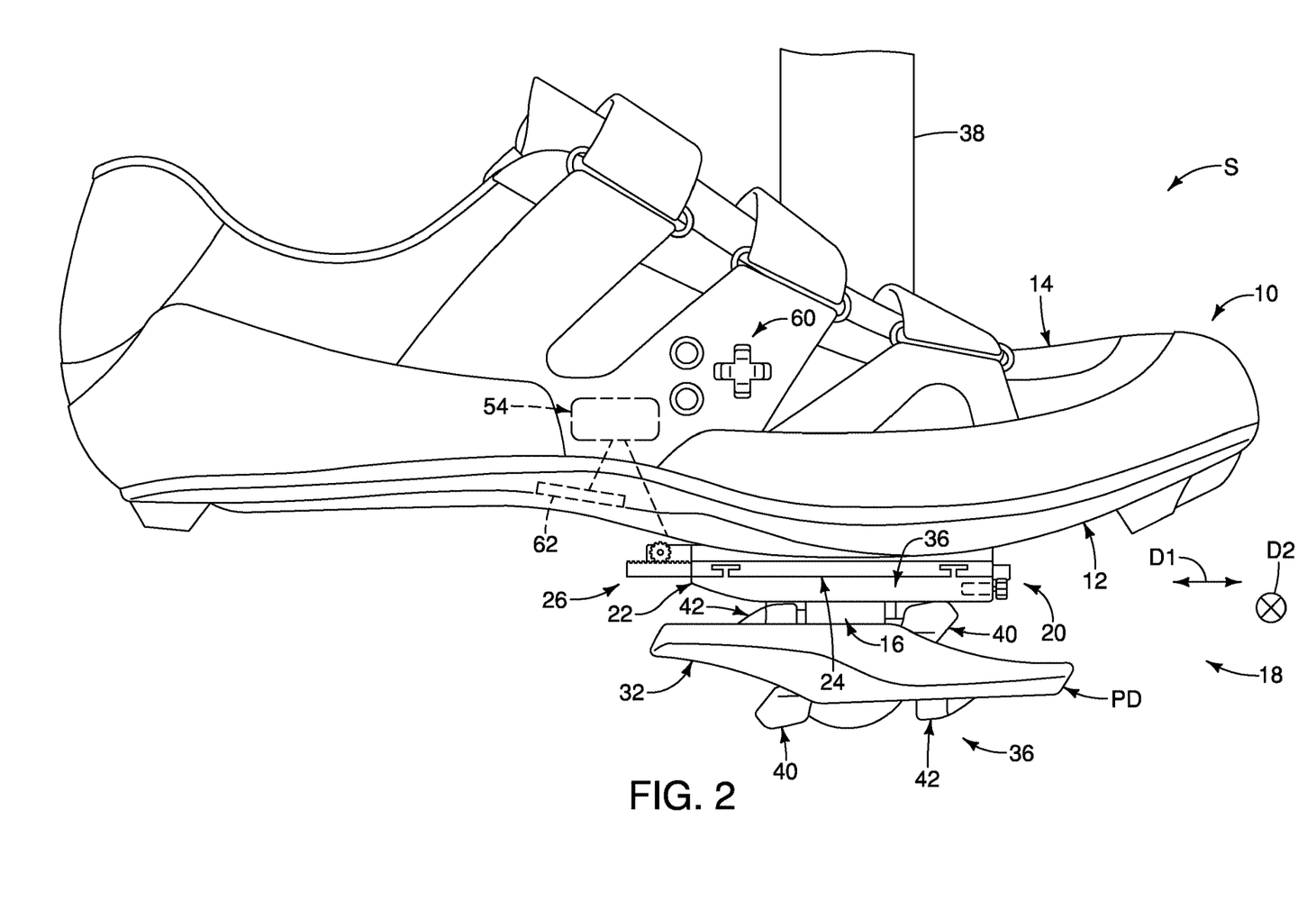
FIG. 2 is a side elevational view of the cycling shoe illustrated in FIG. 1 where the cycling shoe is engaged with a pedal via the cleat.
Figure 3:
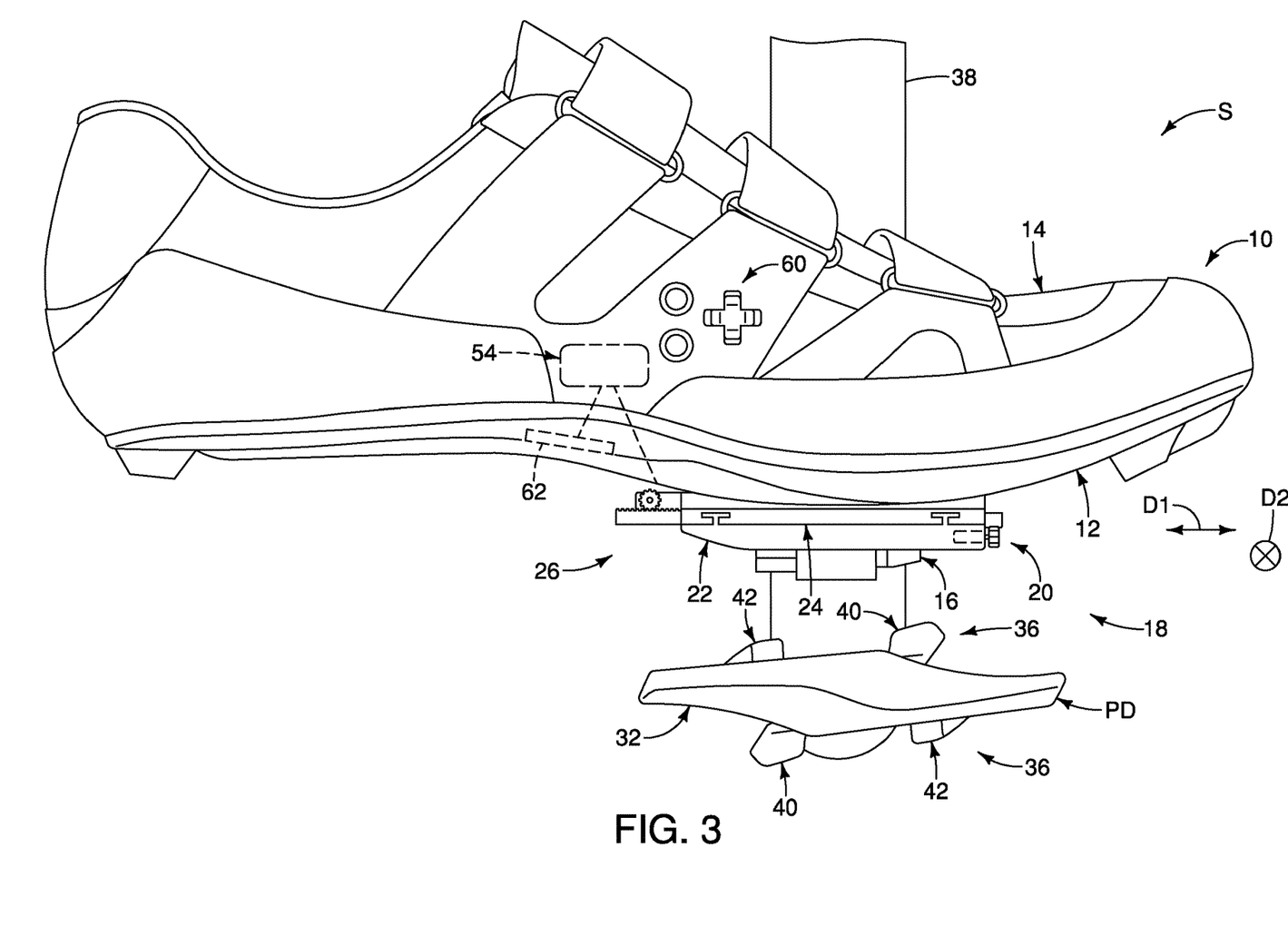
FIG. 3 is a side elevational view of the cycling shoe illustrated in FIG. 1 where the cycling shoe is disengaged from the pedal.

Referring initially to FIGS. 1 to 3, a cycling shoe system S is illustrated that used with a bicycle B in accordance with one embodiment. Here, the cycling shoe system S basically includes a cycling shoe 10 that is used in conjunction with at least one of a bicycle sensor that provides bicycle information regarding the bicycle B being ridden and at least one user information sensor that provides user information regarding a user wearing the cycling shoe 10. As explained below, the position of the cycling shoe 10 relative to a pedal PD is adjusted based on at least one of the bicycle information and the user information.

Here, the bicycle B is provided with a plurality of bicycle sensors BS for providing the bicycle information of the bicycle B that is being ridden by a rider wearing the cycling shoe 10. Here, the cycling shoe 10 is provided with one or more shoe sensors SS for providing the user information of a rider wearing the cycling shoe 10. Also, here, the cycling shoe system S further includes a rider monitoring device FM for providing the user information of a rider wearing the cycling shoe 10. The rider monitoring device FM can also be called a user physical fitness monitor. Here, the bicycle B and the rider monitoring device FM wirelessly send data to the cycling shoe 10. For example, the bicycle B includes a controller ECU and a wireless communicator WC. The controller ECU receives the bicycle information from the bicycle sensors BS which is then provided to the wireless communicator WC for transmitting the bicycle information to the cycling shoe 10. Similarly, the rider monitoring device FM includes a controller and a wireless communicator for transmitting the user information to the cycling shoe 10. On the other hand, the shoe sensors SS are provided in the cycling shoe 10, and thus, can communicate the user information by wired communication.

Preferably, the bicycle information includes a bicycle condition. In particular, the bicycle condition includes at least one of a forward speed, a pedaling cadence, a pedaling input power, a driving force of a drive unit and global positioning coordinates of a bicycle. The bicycle condition is detected by the bicycle sensors BS. Thus, for example, the bicycle sensors BS include a forward speed sensor BS1, a pedaling cadence sensor B2, a pedaling input sensor BS3 and a GPS sensor BS4. The forward speed sensor BS1 is configured to detect information corresponding to a forward speed of the bicycle B. The cadence sensor BS2 is configured to detect information corresponding to a rotational speed of a crank axle of the bicycle B. The pedaling input sensor BS3 is configured to detect information corresponding to a torque applied to a crank of the bicycle B by a human driving force. The GPS sensor BS4 is configured to detect information corresponding to global positioning coordinates of the bicycle B.

On the other hand, the user information includes a shoe condition. The shoe condition is detected by the shoe sensors SS. In particular, the shoe condition includes a temperature of an inner sole, humidity of the inner sole and an inner sole pressure received from a user. In addition, the user information includes a user condition. The user condition is detected by the rider monitoring device FM. In particular, the user condition includes at least one of heart rate, body temperature, blood oxygen concentration and blood lactate level.

Here, the cycling shoe 10 is a left cycling shoe. Preferably, the cycling shoe system S includes a right cycling shoe that is a mirror image of the cycling shoe 10. Thus, the following description of the cycling shoe 10 applies to a right cycling shoe. However, the cycling shoe 10 can be configured as a dominate shoe and the right cycling shoe can be configured as a subordinate shoe. In this way, when the cycling shoe 10 is adjusted either automatically or by a user, the right cycling shoe receives a control signal such that the cycling shoe 10 and the right cycling shoe are adjusted in the same manner.

It should be understood from the drawings and the description herein that the terms "inner side" and "inboard side" refer to the right side of a shoe for the left foot, and the left side of a shoe for the right foot. In other words, the inner side or the inboard side is the side of the shoe facing the shoe on the other foot of the wearer. Similarly, the terms outer side" and "outboard side" refer to the left side of the shoe for the left foot and the right side of the shoe for the right foot. The outer side or the outboard side is the side of the shoe facing away from the shoe on the other foot. As well, the terms "inner side" and "inboard side" are used interchangeably with respect to the present disclosure. Similarly, the terms "outer side" and "outboard side" are also used interchangeably with respect to the description of the present disclosure.

Figure 4:
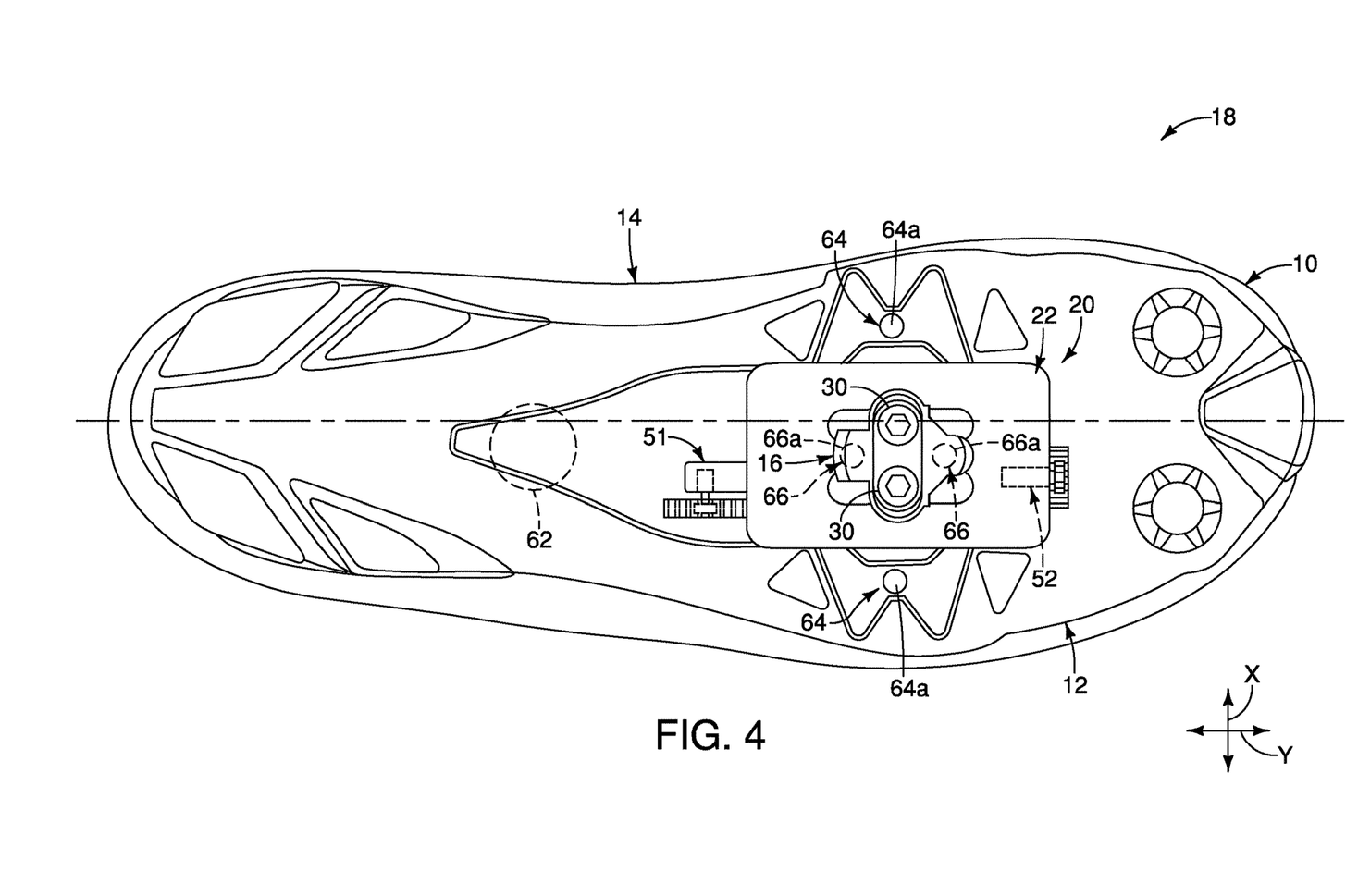
FIG. 4 is a bottom plan view of the cycling shoe illustrated in FIGS. 1 to 3.

Referring now to FIGS. 2 to 4, the cycling shoe 10 comprises a sole 12 and an upper 14. The sole 12 defines a longitudinal direction Y and a lateral direction X that is perpendicular to the longitudinal direction X. The sole 12 supports the upper 14. Specifically, the sole 12 is attached to the upper 14. The sole 12 can be fixedly attached to the upper 14 in a conventional manner, such as with stitching, adhesives, and/or embedding portions the upper 14 within the sole 12. Thus, the upper 14 and the sole 12 are integrated together. Here, the upper 14 is a low-cut style of upper. However, the upper 14 is not limited to the low-cut style, but may be of any style. The upper 14 is made of any suitable natural or polymetric materials. The upper 14 can be formed of an expandable material or a non-expandable material. For example, the upper 14 can be made of a leather material, a nylon mesh and/or any other material that is utilized for conventional uppers.

A cleat 16 is provided for the cycling shoe 10. The pedal PD is configured to be coupled to the cleat 16. As explained below, the cleat 16 is connected to the cycling shoe 10. Thus, the cleat 16 is configured to releasably couple the sole 12 of the cycling shoe 10 to the pedal PD in a conventional manner. The shape of the cleat 16 will depend on the type of pedal that is being used.

Here, basically, a cycling shoe assembly 18 comprises the cycling shoe 10 and the cleat 16. In some embodiment, the cycling shoe assembly 18 further comprises the pedal PD. The cleat 16 is configured to be coupled to the cycling shoe 10. For example, the cleat 16 is coupled to the cycling shoe 10 by a cleat adapter 20. The adjuster 26 is configured to adjust a relative position between the cycling shoe 10 and the cleat 16. In the illustrated embodiment, the cleat adapter 20 basically comprises a first connecting portion 22 and a second connecting portion 24 and an adjuster 26. The adjuster 26 is configured to adjust a relative position between the first connecting portion 22 and the second connecting portion 24. As explained below, the relative position between the first connecting portion 22 and the second connecting portion 24 is automatically adjusted by the adjuster 26 based bicycle information regarding the bicycle B being ridden and user information regarding a user wearing the cycling shoe 10.

The cleat 16 is configured to be connected to the first connecting portion 22. For example, here, the cleat 16 is connected to the first connecting portion 22 by a pair of fixing screws 30. Thus, the cleat 16 is releasably coupled to the first connecting portion 22 in a reinstallable manner. Alternatively, the cleat 16 can be integrated into the first connecting portion 22 as a non-removable part of the first connecting portion 22. Here, the cleat 16 has an overall standard shape for being attached to a pedal PD. However, any type of cleat can be adapted to be used with the cycling shoe assembly 18 as discussed below.

The second connecting portion 24 is provided to the sole 12 of the cycling shoe 10. The second connecting portion 24 is adjustably connected to the first connecting portion 22 by the adjuster 26, as explained below. Here, the second connecting portion 24 is releasably coupled to the sole 12 by a plurality of fasteners (e.g., fixing screws). Alternatively, the second connecting portion 24 can be integrated into the sole 12 as a non-removable part of the sole 12.

Figure 5:
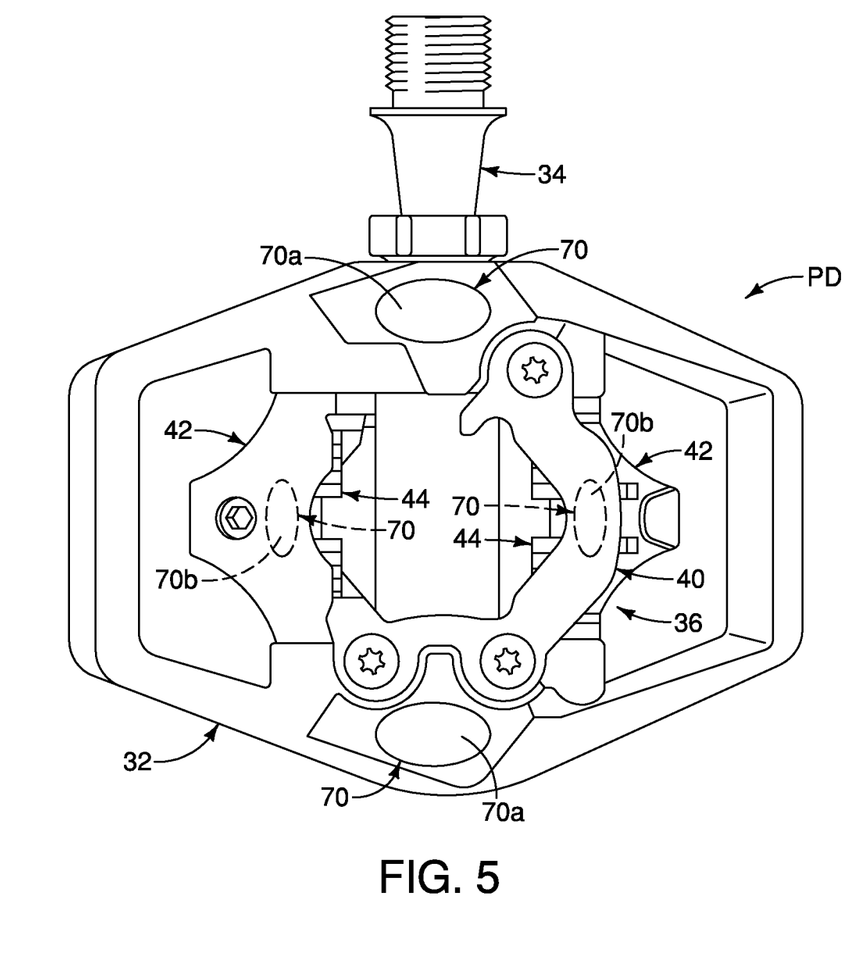
FIG. 5 is a top plan view of the pedal illustrated in FIGS. 2 and 3.

As seen in FIGS. 2, 3 and 5, the pedal PD basically includes a pedal body 32 and a pedal axle 34. The pedal body 32 is provided with a pair of cleat coupling mechanisms 36. The pedal axle 34 is configured to be fastened to a crank 38 of the bicycle B. The pedal body 32 is rotatably supported on the pedal axle 34. The cleat coupling mechanisms 36 releasably secure the cleat 16 to the pedal body 32 in a conventional manner. Thus, the pedal PD is know as a clipless pedal or a step-in pedal. Each of the cleat coupling mechanisms 36 includes a front cleat securing member 40 and a rear cleat securing member 42. The front cleat securing members 40 are non-movably fixed to the pedal body 32. The rear cleat securing members 42 are pivotally coupled to the pedal body 32. The rear cleat securing members 42 are biased to a cleat securing position by a biasing element 44 such as one or more torsion springs. When coupling the cleat 16 to the pedal body 32, the front end of the cleat 16 is engaged with one of the front cleat securing members 40 and then the rear end of the cleat 16 is pushed down on one of the rear cleat securing members 42 to cause the rear cleat securing member 42 to pivoted rearward. Then the rear cleat securing member 42 moves back to the cleat securing position by the biasing element 44, and the cleat 16 is attached to the pedal body 32. The cleat 16 is released from the pedal body 32 by the rider twisting the cleat 16 relative to the pedal body 32 in a lateral direction of the pedal body 32.

In the illustrated embodiment, the adjuster 26 is configured to adjust the relative position in a first direction D1 and a second direction D2 that is different with the first direction D1. In FIGS. 2 and 3, the first direction D1 is indicated by the symbol "⊗" which indicates a direction perpendicular to the drawing sheet. The first direction D1 is the longitudinal direction Y of the sole 12 of the cycling shoe 10. The second direction D2 is the lateral direction X of the sole 12 of the cycling shoe 10.

To accomplish this two directions of movement, two linear displacement devices are used for adjusting the cleat 16 in the first direction D1 and the second direction D2. Here, the first connecting portion 22 is slidably connected to the sole 12 of the cycling shoe 10 by a first linear displacement device. For example, the first linear displacement device includes a pair of first rails provided to one of the sole 12 and the first connecting portion 22, and a pair of first tracks provided to the other of the sole 12 and the first connecting portion 22. The first rails and first tracks are arranged parallel to the longitudinal direction Y of the cycling shoe 10. In this way, the cleat 16 can be move relative to the cycling shoe 10 the first direction D1. Here, the second connecting portion 24 is slidably connected to the sole 12 of the cycling shoe 10 by a second linear displacement device. For example, the second linear displacement device includes a pair of second rails provided to one of the sole 12 and the second connecting portion 24, and a pair of second tracks provided to the other of the sole 12 and the second connecting portion 24. The second rails and second tracks are arranged parallel to the lateral direction X of the cycling shoe 10. In this way, the cleat 16 can be move relative to the cycling shoe 10 the second direction D2.

Here, the adjuster 26 basically comprises a first actuator 51 and a second actuator 52. The first actuator 51 is operatively coupled to the first linear displacement device. The second actuator 52 is operatively coupled to the second linear displacement device. In the illustrated embodiment, each of the first actuator 51 and the second actuator 52 includes a motor that is configured to adjust the relative position in discrete steps. Preferably, the first actuator 51 and the second actuator 52 are reversible electric stepper motors.

Figure 6:
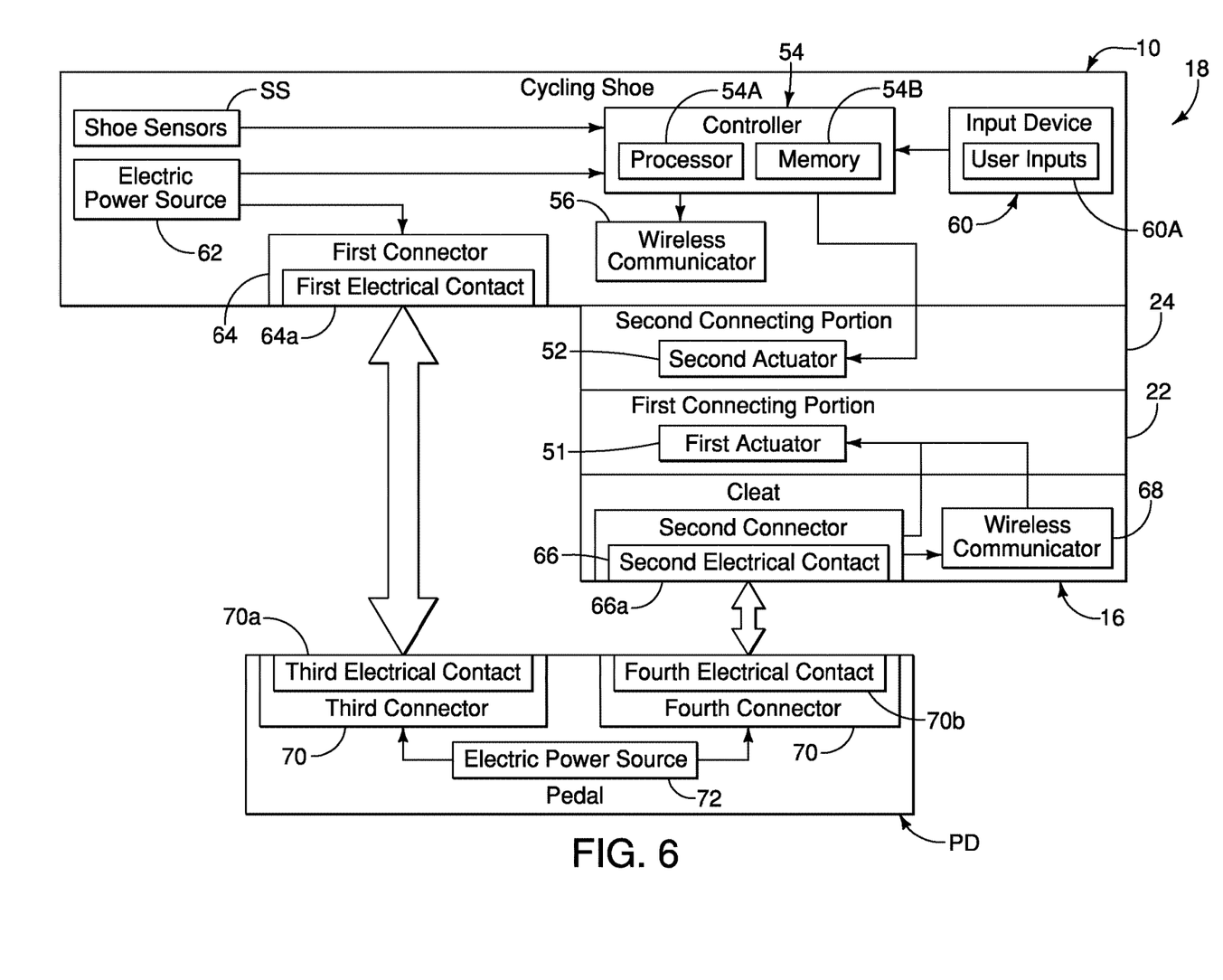
FIG. 6 is an overall diagrammatic view of the cycling shoe assembly including the cycling shoe illustrated in FIGS. 1 to 4 and the cleat illustrated in FIGS. 2 to 4.

Referring now to FIG. 6, an electrical diagram is illustrated for the cycling shoe 10, the cleat 16 and the pedal PD. The cleat adapter 20 further comprises a controller 54. The controller 54 is configured to control the first actuator 51 and the second actuator 52 to move the cleat 30 with respect to the sole 12 in responses to either a user input or based on at least one of the bicycle information and the user information. Also, the controller 54 is configured to control corresponding actuators of the right cycling shoe. However, as mentioned above, the cycling shoe 10 can be independent from the right cycling shoe. Thus, the right cycling shoe can be provided with its own controller.

Basically, the controller 54 is configured to determine a target position of the cleat 16 based on at least one of the bicycle information and the user information. In the illustrated embodiment, the controller 54 is configured to control the first actuator 51 and the second actuator 52 to adjust the position of the one of the first connecting portion 22 and the second connecting portion 24 to the target position. In this way, the position of the cleat 16 with respect to the sole 12 is adjusted automatically to the target position based on at least one of the bicycle information and the user information. In the illustrated embodiment, the target position includes a longitudinal target position and a lateral target position.

As seen in FIG. 6, the controller 54 includes least one processor 54A that executes a predetermined control program for selectively operating the first actuator 51 and the second actuator 52 to position the cleat 16 relative to the sole 12. The at least one processor 54A can be, for example, a central processing unit (CPU) or a micro processing unit (MPU). The controller 54 can include processors provided at positions separate from each other. The controller 54 can include one or more microcomputers. The controller 54 is formed of one or more semiconductor chips that are mounted on a circuit board. Thus, the controller 54 is an electronic controller. The term "electronic controller" as used herein refers to hardware that executes a software program, and does not include a human.

The controller 54 further comprises a memory 54B having stored one or more target position settings corresponding to the user information. The memory 54B stores various control programs and information used for various control processes. The memory 54B is any computer storage device or any non-transitory computer-readable medium with the sole exception of a transitory, propagating signal. For example, the memory 54B includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

The memory 54B also, preferably has an initial position for the cleat 16 relative to the sole 12 of the cycling shoe 10. The initial position for the cleat 16 is preferably set based on an initial position of the first connecting portion 22 relative to the sole 12 of the cycling shoe 10, and an initial position of the second connecting portion 24 relative to the sole 12 of the cycling shoe 10. Alternatively, the initial position for the cleat 16 can be set based on either the initial position of the first connecting portion 22 or the initial position of the second connecting portion 24. The initial position can be either a factory default position or a user set default position.

The target position can be adjusted based on prestored tables or prestored maps, which are preferably user adjustable. Alternatively, the target position can be adjusted based on a formula such as the lateral target position is adjusted two millimeters for each increase or decrease of twenty watts (W) of pedaling input power once the forward speed is over 20 kmph and the pedaling input power is greater than 200 W. Also, the target position can be adjusted in one direction based on one or more of the bicycle information and/or one or more of the user information. For example, the target position is adjusted so that the cleat 16 moves forward a predetermined amount relative to the sole 12 as pedaling force increases, and so that the cleat 16 moves backward a predetermined amount relative to the sole 12 as pedaling force decreases. In another example, the target position is adjusted so that the cleat 16 moves forward a predetermined amount relative to the sole 12 as cadence increases, and so that the cleat 16 moves backward a predetermined amount relative to the sole 12 as cadence decreases. In another example, the target position is adjusted so that the cleat 16 is moved to a predetermined position based on the type of traveling surface as determined by the GPS coordinates. In particular, the target position can be different for paved roads, unpaved roads and off road.

Generally, the target positions are preferably set such that (1) there is no adjustment from the initial position at low speeds, for example, 2 kmph or less, (2) the cleat 16 is moved backward when traveling on level ground at a constant speed or a small acceleration, (3) the cleat 16 is moved forward when traveling uphill and with a high pedaling power, and (4) the cleat 16 is moved forward when traveling with a high acceleration.

Here, the cycling shoe assembly 18 further comprises a communicator 56. The communicator 56 is configured to communicate with at least one bicycle part to receive status data from the at least one bicycle part. In other words, the communicator 56 is configured to receive the bicycle information from at least one bicycle part such as a rear derailleur, a cycle computer, a crank assembly, etc. Here, as seen in FIG. 1, the wireless communicator WC of the bicycle B can be provided in at least one bicycle part of the bicycle B. Thus, while only one wireless communicator is illustrated in FIG. 1, various bicycle parts of the bicycle B can be provided with a bicycle B can be provided that communicates with the communicator 56. Also, the communicator 56 is configured to communicate with the rider monitoring device FM to receive physical data from the rider monitoring device FM. Here, the communicator 56 wirelessly communicates with the rider monitoring device FM. Thus, the communicator 56 includes a wireless communicator. Also, the wireless communicator 56 is configured to wirelessly supply the physical data. In particular, the bicycle information and the user information such as the physical data are used by the controller 54 for selectively operating the first actuator 51 and the second actuator 52 to position the cleat 16 relative to the sole 12.

The cycling shoe assembly 18 further comprises an input device 60 that is configured to operate the adjuster 26. Here, the input device 60 is provided on the upper 14 of the cycling shoe 10. Alternatively, a remote input device can be used to wirelessly communicate user commands to the wireless communicator 56. The input device 60 includes a plurality of user inputs 60A. Here, the user inputs 60A are buttons. However, the user inputs 60A can include, for example, a toggle switch, a lever, a dial and/or a touch screen. Here, the input device 60 communicates with the controller 54 using power line communication (PLC).

As seen in FIGS. 4 and 6, the cycling shoe 10 further comprises an electric power source 62. The electric power source 62 is configured to supply electric power to the controller 54, the communicator 56, the input device 60 and the second actuator 52. The electric power source 62 can also supply electric power to the shoe sensors SS as needed and/or desired. Preferably, the electric power source 62 includes at least one of a rechargeable battery and a capacitor. Here, the cycling shoe 10 further comprises a first connector 64. The first connector 64 is configured to be electrically connected to the pedal PD in a coupled state where the cleat 16 is coupled with the pedal PD. Here, the first connector 64 includes a first electrical contact 64a. As seen in FIG. 4, the first electrical contact 64a includes a negative contact and a positive contact. The first electrical contact 64a is configured to make direct contact with the pedal PD for establishing an electrical connection between the cycling shoe 10 and the pedal PD. The first electrical contact 64a of the first connector 64 is electrically connected to the electric power source 62. In this way, the electric power source 62 of the cycling shoe 10 can be recharged by electric power from the pedal PD.

As seen in FIGS. 4 and 6, the cleat 16 has a second connector 66. The cleat 16 has a second connector 66 that is configured to be electrically connected to the pedal PD in a coupled state where the cleat 16 is coupled with the pedal PD. Here, the second connector 66 includes a second electrical contact 66a. As seen in FIG. 4, the second electrical contact 66a includes a negative contact and a positive contact. The second electrical contact 66a is configured to make direct contact with the pedal PD for establishing an electrical connection between the cleat 16 and the pedal PD. In this way, the electric power from the pedal PD is supplied to the first actuator 51 of the cleat 16. Here, the cleat 16 further includes a communicator 68 that communicates with the communicator 56 of the cycling shoe 10. In particular, the communicator 68 wirelessly communicates with the wireless communicator 56. Thus, the communicator 68 includes a wireless communicator. In this way, the wireless communicator 68 receive the bicycle information and the user information from the wireless communicator 56 for controlling the first actuator 51.

The cycling shoe assembly 18 further comprises an electric device. The electric device is disposed in one of the cycling shoe 10 and the cleat 16. In the embodiment of FIG. 6, the cycling shoe 10 includes an electric device and the cleat 16 also includes an electric device. In particular, the cycling shoe 10 includes the second actuator 52 which is an electric device that is integrated with the sole 12 via the second connecting portion 24. On the other hand, the cleat 16 includes the first actuator 51 which is an electric device that is integrated with the cleat 16 via the first connecting portion 22. Also, the cycling shoe 10 and/or the cleat 16 can be provided with other electric devices such as an LED and/or a light bulb.

As seen in FIGS. 5 and 6, the pedal PD has a third connector 70. Also, an electric power source 72 is disposed in the pedal PD. The third connector 70 is configured to be electrically connect to at least one of the first connector 64 and the second connector 66 in a coupled state where the cleat 16 is coupled with the pedal PD, and supply electric power to the electric device. As mentioned above, in the embodiment of FIG. 6, the electric device of the cleat 16 corresponds to the first actuator 51, and the electric device of the cycling shoe 10 corresponds to the second actuator 52.

Here, in the embodiment of FIG. 6, the third connector 70 includes a third electrical contact 70a that is configured to be directly in contact with the first electrical contact 64a in the coupled state. Also, in the embodiment of FIG. 6, the third connector 70 includes a fourth electrical contact 70b that is configured to directly contact the second electrical contact 66a in the coupled state. As seen in FIG. 5, the third electrical contact 70a includes a negative contact and a positive contact. The third electrical contacts 70a are provided to each side of the pedal body 32. Likewise, the fourth electrical contact 70b includes a negative contact and a positive contact. The fourth electrical contacts 70b are provided to each of the front cleat securing members 40 and each of the rear cleat securing members 42. The third electrical contact 70a is configured to make direct contact with the first electrical contact 64a for establishing an electrical connection between the cycling shoe 10 and the pedal PD. In this way, the electric power from the electric power source 72 of the pedal PD is supplied to the cycling shoe 10. The electric power from the electric power source 72 of the pedal PD can be used to power the second actuator 52 and/or recharge the electric power source 62. The fourth electrical contact 70b is configured to make direct contact with the second electrical contact 66a for establishing an electrical connection between the cleat 16 and the pedal PD. In this way, the electric power from the electric power source 72 of the pedal PD is supplied to the cleat 16. The electric power from the electric power source 72 of the pedal PD can be used to power the first actuator 51 and/or other electric devices provided to the cleat 16.

Figure 7:
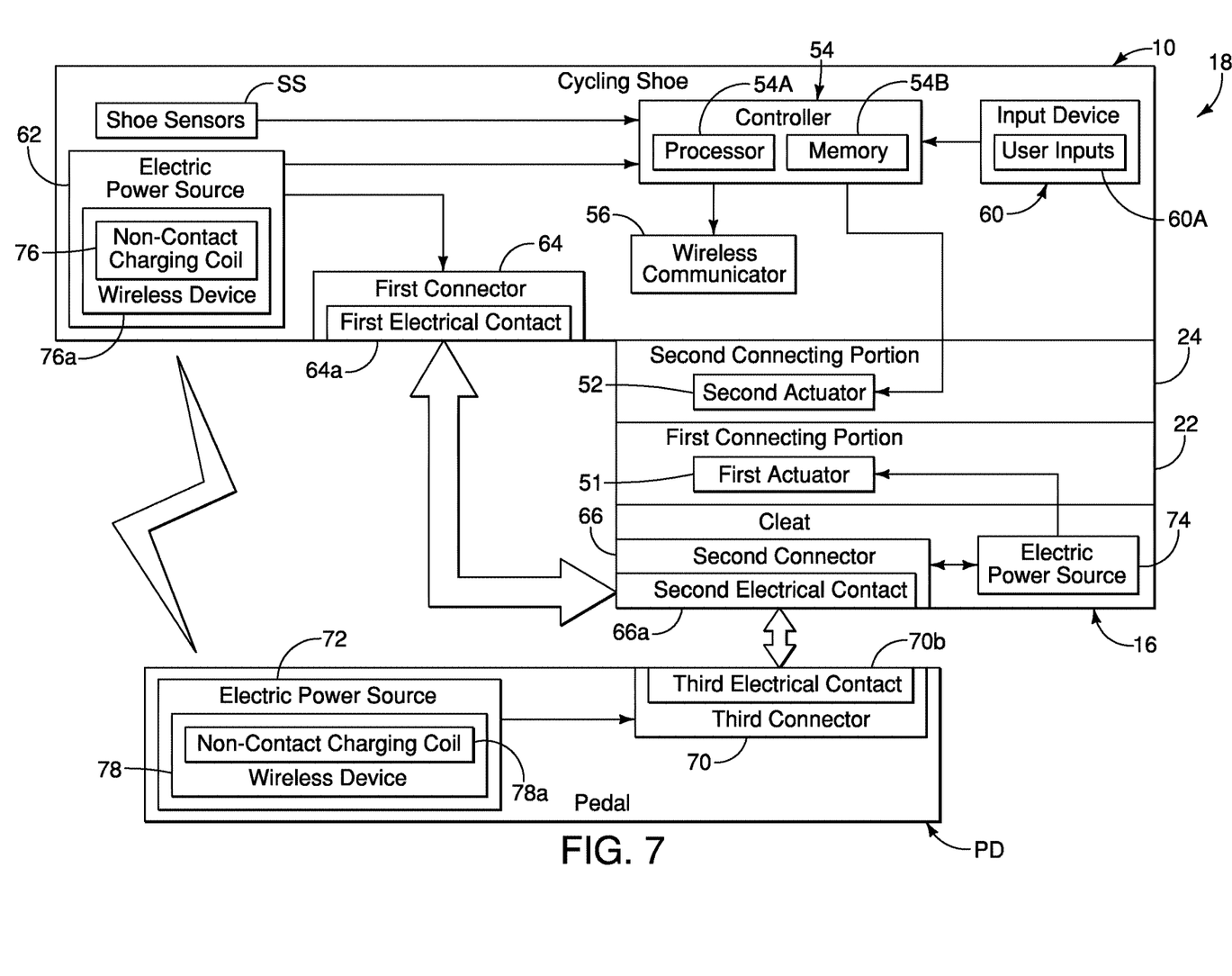
FIG. 7 is an overall diagrammatic view of a cycling shoe assembly in accordance with a first modification.

Referring now to FIG. 7 is an overall diagrammatic view of a cycling shoe assembly 18A is illustrated in accordance with a first modification. In view of the similarity between the cycling shoe assembly 18 and the cycling shoe assembly 18A, the parts of the cycling shoe assembly 18A that are identical to the parts of the cycling shoe assembly 18 will be given the same reference numerals as the parts of the cycling shoe assembly 18. Moreover, the descriptions of the parts of the cycling shoe assembly 18A that are identical to the parts of the cycling shoe assembly 18 will be omitted for the sake of brevity.

In the cycling shoe assembly 18A, the first connector 64 includes the first electrical contact 64a, and the second connector 66 includes the second electrical contact 64a. Here, the second electrical contact 66a is configured to directly contact the first electrical contact 64a. Thus, the second connector 66 is configured to be supplied the electric power from the electric power source 72, and to supply the electric power to the first connector 64 in the coupled state. Also, in the cycling shoe assembly 18A, the electric power source 72 is disposed in the pedal PD. The electric power source 72 of the pedal PD is configured to recharge the electric power source 62 of the cycling shoe 10 in a non-contactless manner as explained below.

Moreover, in the cycling shoe assembly 18A, the cleat 16 comprises an electric power source 74. In other words, the electric power source 74 is disposed in the cleat 16. Preferably, the electric power source 74 includes at least one of a rechargeable battery and a capacitor. The electric power source 74 is configured to receive electric power from the pedal PD and supply the electric power to the second connector 66 in a coupled state where the cleat 16 is coupled with the pedal PD. Also, the second connector 66 is configured to be supplied the electric power from the electric power source 74, and to supply the electric power to the electric device (e.g., the first actuator 51) in the coupled state. The electric power from the electric power source 72 is transmitted from the third electrical contact 70a to the first electrical contact 64a via the second electrical contact 64a. In other words, the second electrical contact 64a directly contacts the first electrical contact 64a and the fourth electrical contact 70b. Thus, the electric power from the electric power source 72 can be used to recharge both the electric power source 62 and the electric power source 74. Here, the third electrical contact 70a can be omitted from the pedal PD if needed and/or desired.

Since the cleat 16 includes the electric power source 74, the cycling shoe 10 and the cleat 16 can communicate via power line communication (PLC). In other words, the electric power source 62 and the electric power source 74 are each provided with a PLC circuit that communicates signals using a voltage line. Thus, a wireless communicator can be omitted from the cleat 16. Alternative, the wireless communicator 68 can be provided to the cleat 16 of the cycling shoe assembly 18A similar to the cycling shoe assembly 18 discussed above.

In the cycling shoe assembly 18A, the electric power source 62 includes a wireless device 76 that is configured to wirelessly receive the electric power. More specifically, the wireless device 76 includes a non-contact charging coil 76a. Thus, the wireless device 76 is a wireless power receiver that is configured to receive wirelessly electric power. Also, the electric power source 72 includes a wireless device 78 that is configured to wirelessly supply the electric power. More specifically, the wireless device 78 includes a non-contact charging coil 78a. Thus, the wireless device 76 is a wireless power transmitter that is configured to wirelessly transmit electric power.

In the cycling shoe assembly 18A, the electric power source 62 is connected to the electric power source 74 via the electrical connection between the first connector 64 and the second connector 66. In way, the electric power source 62 is configured to receive electric power from the pedal PD and supply the electric power to the first connector 64 in a coupled state where the cycling shoe 10 is coupled with the pedal PD. The electric power is then transmitted from the first connector 64 to the electric power source 74 via the second connector 66. Also, in the cycling shoe assembly 18A, the electric power source 62 can be recharged from the electric power source 74 if wireless transmission of electric power from the wireless device 78a to the wireless device 76a becomes interrupted or otherwise impaired. In other words, the second connector 66 is configured to be supplied the electric power from the electric power source 74, and to supply the electric power to the first connector 64 in the coupled state. In this way, the electric power supplied the electric power from the electric power source 74 can be transmitted to the electric power source 62 via the electrical connection between first connector 64 and the second connector 66.

The non-contact charging coil 76a and the non-contact charging coil 78a can use magnetic resonance to charge the electric power source 62 with electric power from the electric power source 72. Alternatively, non-contact charging coil 76a and the non-contact charging coil 78a can use Near-Field Communication (NFC) to charge the electric power source 62 with electric power from the electric power source 72, and communicate between the cycling shoe 10 and the pedal PD.

Figure 8:
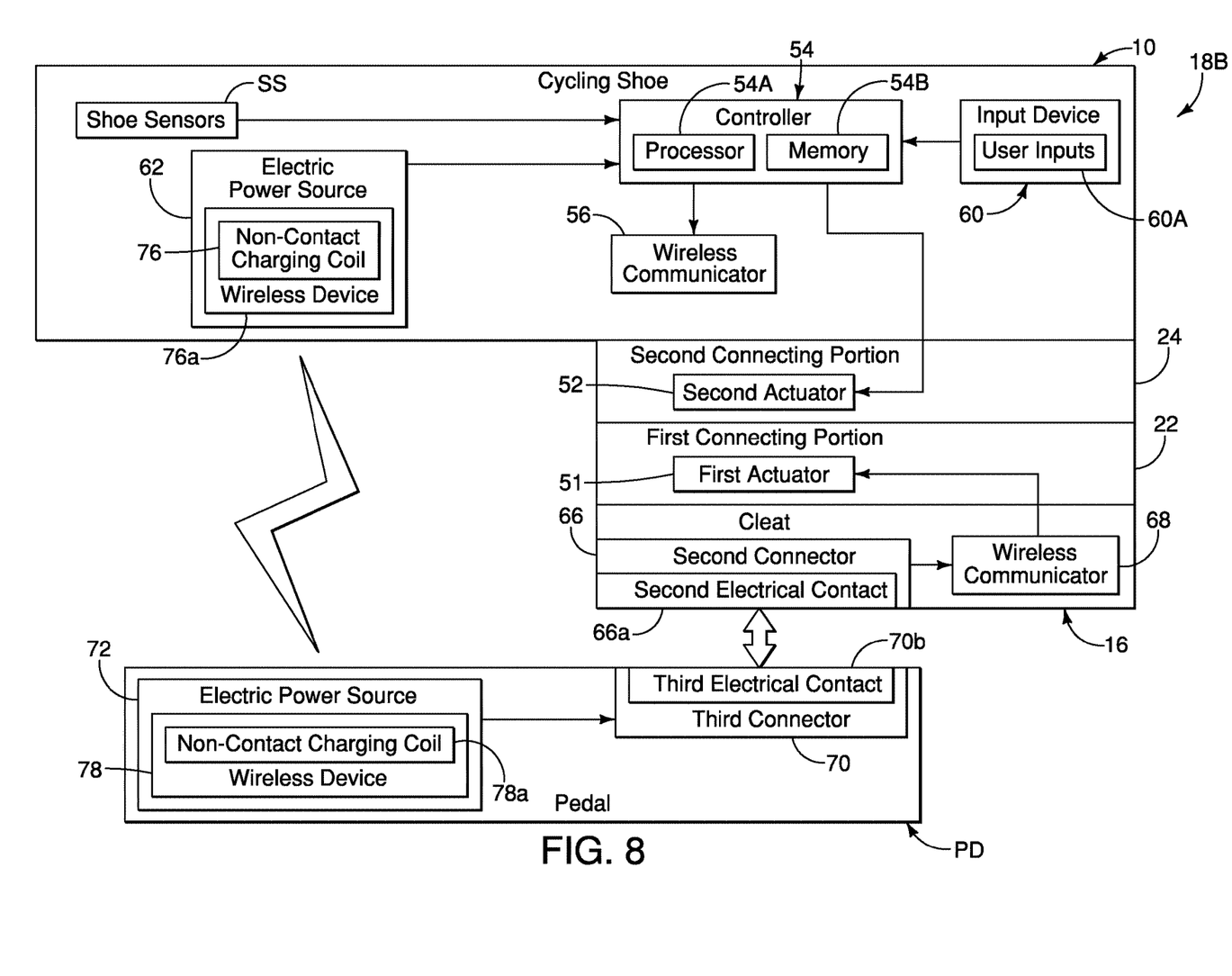
FIG. 8 is an overall diagrammatic view of a cycling shoe assembly in accordance with a second modification.

Referring now to FIG. 8 is an overall diagrammatic view of a cycling shoe assembly 18B is illustrated in accordance with a second modification. In view of the similarity between the cycling shoe assembly 18, the cycling shoe assembly 18A and the cycling shoe assembly 18B, the parts of the cycling shoe assembly 18B that are identical to the parts of the cycling shoe assembly 18 and/or the cycling shoe assembly 18A will be given the same reference numerals as the parts of the cycling shoe assembly 18 and/or the cycling shoe assembly 18A. Moreover, the descriptions of the parts of the cycling shoe assembly 18B that are identical to the parts of the cycling shoe assembly 18 and/or the cycling shoe assembly 18A will be omitted for the sake of brevity.

In the cycling shoe assembly 18B, the pedal PD wirelessly transmits power to the cycle shoe 10 and transmits power to the cleat 16 via direct electrical connection between the second electrical contact 66a and the fourth electrical contact 70b. In the embodiment of FIG. 8, the first electrical connector can be omitted. Thus, the pedal PD wirelessly transmits power to the cycle shoe 10 in the same manner as in the cycling shoe assembly 18A of FIG. 7. Also, the pedal PD wirelessly transmits power to the cleat 16 in the same manner as in the cycling shoe assembly 18 of FIG. 6 and in the cycling shoe assembly 18A of FIG. 7.

Figure 9:
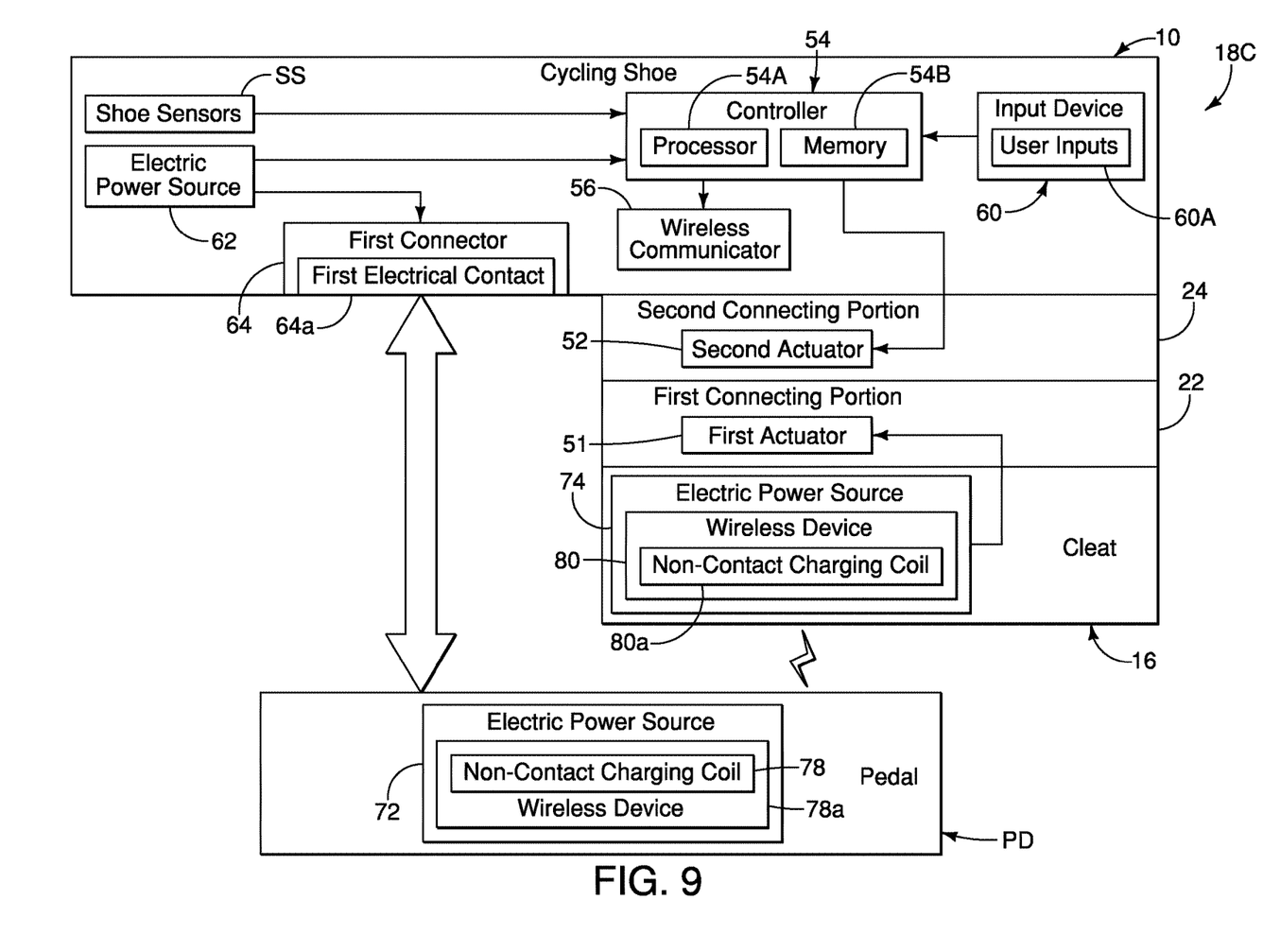
FIG. 9 is an overall diagrammatic view of a cycling shoe assembly in accordance with a third modification.

Referring now to FIG. 9 is an overall diagrammatic view of a cycling shoe assembly 18C is illustrated in accordance with a third modification. In view of the similarity between the cycling shoe assembly 18, the cycling shoe assembly 18A and the cycling shoe assembly 18B and the cycling shoe assembly 18C, the parts of the cycling shoe assembly 18C that are identical to the parts of the cycling shoe assembly 18 and/or the cycling shoe assembly 18B will be given the same reference numerals as the parts of the cycling shoe assembly 18 and/or the cycling shoe assembly 18B. Moreover, the descriptions of the parts of the cycling shoe assembly 18D that are identical to the parts of the cycling shoe assembly 18, the cycling shoe assembly 18A and/or the cycling shoe assembly 18B will be omitted for the sake of brevity.

In the cycling shoe assembly 18C, the pedal PD wirelessly transmits power to the cleat 16 and transmits power to the cycle shoe 10 via direct electrical connection between the first electrical contact 64a and the third electrical contact 70a. In the embodiment of FIG. 9, the second electrical connector can be omitted. Thus, the pedal PD wirelessly transmits power to the cycle shoe 10 in the same manner as in the cycling shoe assembly 18 of FIG. 6.

Here, in the cycling shoe assembly 18C, the cleat 16 includes the electric power source 74. The electric power source 74 includes a wireless device 80 that is configured to wirelessly receive the electric power. More specifically, the wireless device 80 includes a non-contact charging coil 80a. Thus, the wireless device 80 is a wireless power receiver that is configured to receive wirelessly electric power. Also, in the cycling shoe assembly 18C, the electric power source 72 includes the wireless device 78 that is configured to wirelessly supply the electric power. Thus, the wireless device 78 includes the non-contact charging coil 78a, which is discussed above. Thus, the wireless device 78 is a wireless power transmitter that is configured to wirelessly transmit electric power to the wireless device 80.

Figure 10:
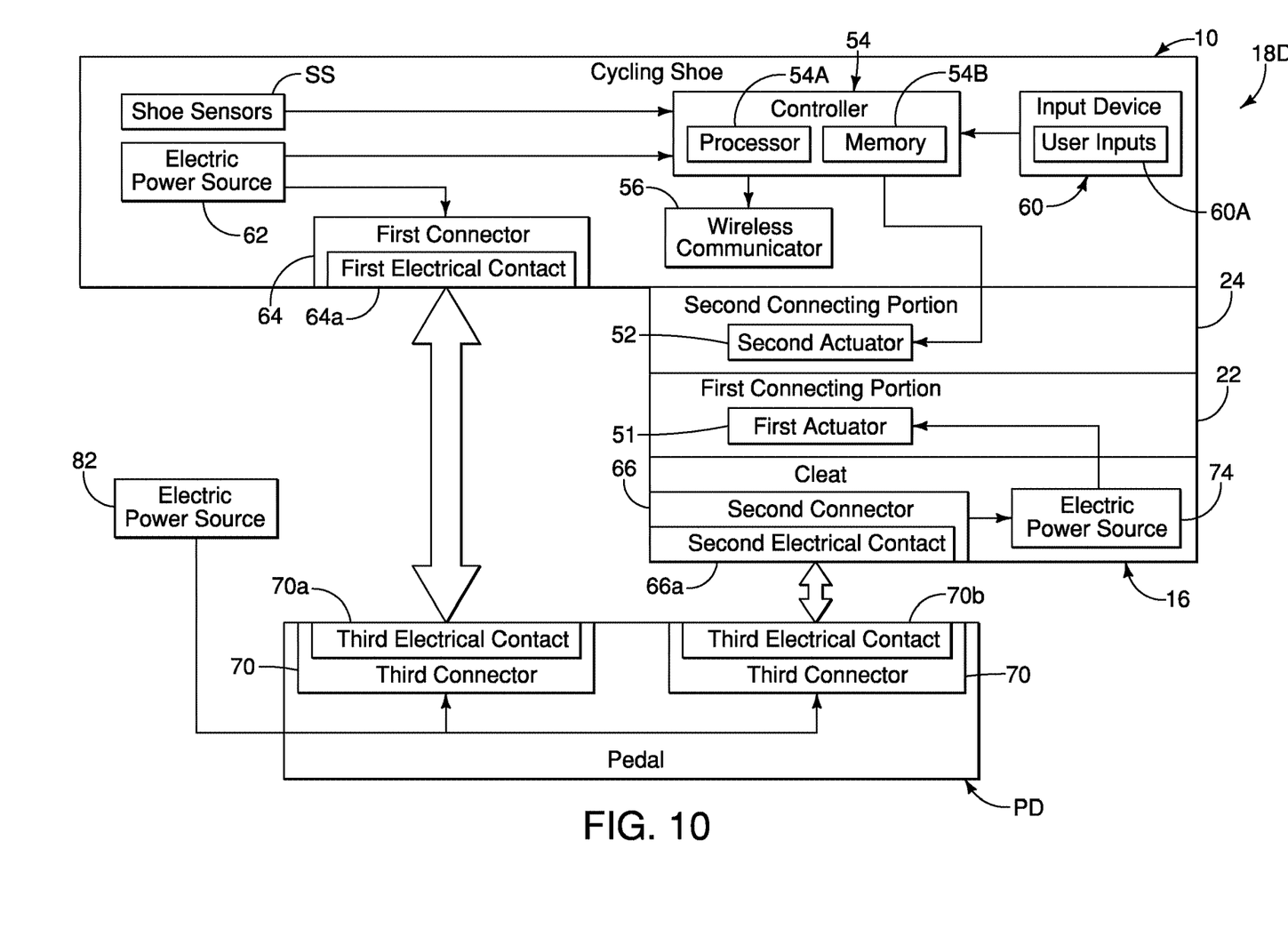
FIG. 10 is an overall diagrammatic view of a cycling shoe assembly in accordance with a fourth modification.

Referring now to FIG. 10 is an overall diagrammatic view of a cycling shoe assembly 18D is illustrated in accordance with a fourth modification. In view of the similarity between the cycling shoe assembly 18, the cycling shoe assembly 18A, the cycling shoe assembly 18B, the cycling shoe assembly 18C and the cycling shoe assembly 18D, the parts of the cycling shoe assembly 18D that are identical to the parts of the cycling shoe assembly 18, the cycling shoe assembly 18A, the cycling shoe assembly 18B and/or the cycling shoe assembly 18C will be given the same reference numerals as the parts of the cycling shoe assembly 18, the cycling shoe assembly 18A, the cycling shoe assembly 18B and/or the cycling shoe assembly 18C. Moreover, the descriptions of the parts of the cycling shoe assembly 18D that are identical to the parts of the cycling shoe assembly 18, the cycling shoe assembly 18A, the cycling shoe assembly 18B and/or the cycling shoe assembly 18C will be omitted for the sake of brevity.

In the cycling shoe assembly 18D, the electric power source of the pedal PD has been omitted. Thus, in the embodiment of FIG. 10, the electric power source 62 of the cycling shoe 10 and the electric power source 74 of the cleat 16 are recharged from an electric power source 82 that is provided to a bicycle part of the bicycle B. The electric power source 82 can be provided to a bicycle frame, a crankset or any other suitable bicycle part. In any case, in the cycling shoe assembly 18D, the electric power source 82 is provided to a part of the bicycle B. Thus, the cycling shoe assembly 18D further comprises the electric power source 82 that is configured to supply the electric power to the electric device via one of the first connector 64 and the second connector 66.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a cycling shoe in an upright position on a horizontal surface. The terms "left" and "right" are used to indicate the "right" when referencing from the right side as viewed from the rear of the cycling shoe, and the "left" when referencing from the left side as viewed from the rear of the cycling shoe.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of".

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A cycling shoe assembly comprising:
   a cycling shoe;
   a cleat configured to be coupled to the cycling shoe;
   an electric device disposed in one of the cycling shoe and the cleat; and
   an electric power source,
   the cycling shoe having a first connector including a first electrical contact, the first electrical contact being arranged and configured to directly contact an electrical contact of a pedal and be electrically connected to the pedal in a coupled state where the cleat is coupled with the pedal,
   the electric power source being arranged and configured to supply the electric power to the electric device via the first connector.

2. A cycling shoe assembly comprising:
   a cycling shoe;
   a cleat configured to be coupled to the cycling shoe, the cleat having a second connector including a second electrical contact, the second electrical contact being arranged and configured to directly contact an electrical contact of a pedal and be electrically connected to the pedal in a coupled state where the cleat is coupled with the pedal;
   an electric device disposed in one of the cycling shoe and the cleat; and
   an electric power source arranged and configured to supply the electric power to the electric device via the second connector.

3. A cycling shoe assembly comprising:
   a cycling shoe;
   a cleat connected to the cycling shoe;
   a first connector provided to the cycling shoe, the first connector including a first electrical contact,
   a second connector provided to the cleat, the second connector including a second electrical contact, respectively;
   an electric device disposed in one of the cycling shoe and the cleat and connected to one of the first connector or the second connector, respectively; and
   a pedal configured to be coupled to the cleat, the pedal having at least one of a third connector including a third electrical contact and a fourth electrical contact including a fourth electrical contact, the third electrical contact being arranged and configured to directly contact the first electrical contact and the fourth electrical contact being arranged and configured to directly contact the second electrical contact in a coupled state where the cleat is coupled with the pedal to enable a transfer of electric power between the shoe and at least one of the cycling shoe and the cleat.

4. The cycling shoe assembly according to claim 3, further comprising:
   a communicator configured to communicate with at least one bicycle part to receive status data from the at least one bicycle part.

5. The cycling shoe assembly according to claim 3, further comprising:
   a communicator configured to communicate with a rider monitoring device to receive physical data from the rider monitoring device.

6. The cycling shoe assembly according to claim 5, wherein
   the communicator includes a wireless communicator configured to wirelessly supply the physical data.

7. The cycling shoe assembly according to claim 3, wherein
   the first electrical contact includes a first negative contact and a first positive contact,
   the second electrical contact includes a second negative contact and a second positive contact, and
   the third electrical contact includes a third negative contact and a third positive contact.

8. A cycling shoe assembly comprising:
   a cycling shoe;
   a cleat connected to the cycling shoe;
   at least one of a first connector provided to the cycling shoe and a second connector provided to the cleat;

an electric device disposed in one of the cycling shoe and the cleat;

a pedal configured to be coupled to the cleat, the pedal having a third connector configured to be electrically connect to the at least one of the first connector and the second connector in a coupled state where the cleat is coupled with the pedal, and supply electric power to the electric device; and an electric power source configured to supply the electric power to the electric device via one of the first connector and the second connector.

9. The cycling shoe assembly according to claim 8, wherein the cycling shoe includes the first connector having the first electrical contact, and the third connector includes a third electrical contact configured to be directly in contact with the first electrical contact in the coupled state.

10. The cycling shoe assembly according to claim 8, wherein the cleat includes the second connector having the second electrical contact, and the third connector includes a third electrical contact configured to directly contact the second electrical contact in the coupled state.

11. The cycling shoe assembly according to claim 8, wherein the cycling shoe includes the first connector having the first electrical contact, and the cleat includes the second connector having the second electrical contact configured to directly contact the first electrical contact.

12. The cycling shoe assembly according to claim 8, wherein the electric power source includes at least one of a rechargeable battery and a capacitor.

13. The cycling shoe assembly according to claim 8, wherein the electric power source includes a wireless device configured to wirelessly supply the electric power.

14. The cycling shoe assembly according to claim 13, wherein the wireless device includes a non-contact charging coil.

15. The cycling shoe assembly according to claim 8, wherein the electric power source is disposed in the cleat; and the second connector is configured to be supplied the electric power from the electric power source, and to supply the electric power to the electric device in the coupled state.

16. The cycling shoe assembly according to claim 8, wherein the electric power source is disposed in the pedal; and the second connector is configured to be supplied the electric power from the electric power source, and to supply the electric power to the first connector in the coupled state.

17. A cycling shoe comprising:

an upper;

a sole attached to the upper;

a first connector including a first electrical contact, the first electrical contact being arranged to directly contact a pedal in a coupled state where the cycling shoe is coupled with the pedal;

an electric device disposed in the cycling shoe; and an electric power source that is connected to the first connector and configured to receive electric power from the pedal via the first connector and supply the electric power to the electric device in the coupled state.

18. A cleat for a cycling shoe comprising:

a second connector including a second electrical contact, the second electrical contact being arranged to directly contact a pedal in a coupled state where the cleat is coupled with the pedal;

an electric device disposed in the cleat; and an electric power source that is connected to the second connector, the electric power source being configured to receive electric power from the pedal via the second connector and supply the electric power to the electric device in the coupled state.

19. The cleat according to claim 18, wherein the electric power source includes a wireless device configured to wirelessly supply the electric power.

* * * * *